(12) United States Patent
Kim et al.

(10) Patent No.: US 12,361,252 B2
(45) Date of Patent: Jul. 15, 2025

(54) DUAL BAND RFID TAG, AND SENSING DATA PROCESSING DEVICE HAVING SAME

(71) Applicant: 3A Logics Inc., Gyeonggi-do (KR)

(72) Inventors: Sung Wan Kim, Gyeonggi-do (KR); Pyeong Han Lee, Gyeonggi-do (KR); Kwang Beom Park, Gyeonggi-do (KR); Sung Hun Chun, Gyeonggi-do (KR); Chang Ho Ryu, Gyeonggi-do (KR)

(73) Assignee: 3A LOGICS INC. (KR)

( * ) Notice: Subject to any disclaimer, the term of this patent is extended or adjusted under 35 U.S.C. 154(b) by 166 days.

(21) Appl. No.: 18/307,453

(22) Filed: Apr. 26, 2023

(65) Prior Publication Data
US 2024/0095484 A1    Mar. 21, 2024

(30) Foreign Application Priority Data
Sep. 18, 2022    (KR) .......................... 10-2022-0117513

(51) Int. Cl.
*G06K 19/07*    (2006.01)
*H01Q 1/22*    (2006.01)

(52) U.S. Cl.
CPC ....... *G06K 19/0724* (2013.01); *G06K 19/072* (2013.01); *H01Q 1/2225* (2013.01)

(58) Field of Classification Search
CPC ............. G06K 19/0724; G06K 19/072; G06K 19/0709; G06K 19/0716; G06K 19/0717;
(Continued)

(56) References Cited

U.S. PATENT DOCUMENTS 5,519,729 A  *  5/1996  Jurisch ............... G06K 19/0723
                                                      370/278
10,594,368 B1 * 3/2020  Wurmfeld ................ H04B 5/26
(Continued)

FOREIGN PATENT DOCUMENTS

EP        3734512 A1    11/2020

OTHER PUBLICATIONS

European Extended Search Report, corresponding to EP application No. 23170066.7, 7 pages.
(Continued)

*Primary Examiner* — Omar Casillashernandez
(74) *Attorney, Agent, or Firm* — J. Clinton Wimbish; Maynard Nexsen PC

(57) ABSTRACT

Proposed is a dual band RFID tag including a first rectifier configured to receive and rectify a first RF signal modulated at a first frequency, a first regulator configured to regulate an output voltage of the first rectifier, a second rectifier configured to receive and rectify a second RF signal modulated at a second frequency, a second regulator configured to regulate an output voltage of the second rectifier, a voltage distributor connected to a first node and a ground in a state of being positioned therebetween, the output terminal of the first rectifier and the output terminal of the second rectifier being both connected to the first node, a multiplexer configured to output any one of an analog detection signal output from a sensor and an output signal of the voltage distributor, in response to a first selection signal or a second selection signal, and an analog-to-digital converter configured to receive as an operating voltage a voltage of a second node to which an output terminal of the first regulator and an output terminal of the second regulator are both connected and to convert an output voltage of the multiplexer into a digital signal.

10 Claims, 8 Drawing Sheets

(58) Field of Classification Search
CPC ......... G06K 19/0718; G06K 19/07766; H01Q 1/2225; H04B 5/77
USPC ...................................................... 340/10.1
See application file for complete search history.

(56) References Cited

U.S. PATENT DOCUMENTS

| | | |
|---|---|---|
| 2005/0186904 A1 | 8/2005 | Kowalski et al. |
| 2010/0148926 A1 | 6/2010 | Kang et al. |
| 2014/0138432 A1* | 5/2014 | Park .................. G06K 19/0704 235/375 |
| 2019/0363757 A1* | 11/2019 | Mikolajczak ............ H04B 5/77 |
| 2019/0386506 A1* | 12/2019 | Lin ....................... H01M 10/44 |
| 2020/0143218 A1 | 5/2020 | Lee et al. |
| 2020/0349407 A1* | 11/2020 | Coulot ............... G06K 19/0713 |

OTHER PUBLICATIONS

Gong, Chen et al., An NFC on Two-Coll WPT Link for Implantable Biomedical Sensors under Ultra-Weak Coupling, vol. 17, No. 6, Jun. 11, 2017 (Jun. 11, 2017), 1358, XP055691350, DOI: 10.3390/s17061358, 20 pages.

* cited by examiner

DUAL BAND RFID TAG, AND SENSING DATA PROCESSING DEVICE HAVING SAME

RELATED APPLICATION DATA

The present application claims priority pursuant to 35 U.S.C. § 119(a) to Korean Patent Application Number 10-2022-0117513 filed Sep. 18, 2022 which is incorporated herein by reference in its entirety.

1. TECHNICAL FIELD

The present disclosure relates to a dual bank RFID and, more particularly, to a dual band RFIC tag that is capable of transmitting to a reader an RF signal corresponding to an output voltage of a rectifier or an output voltage of a sensor that are subject to a magnitude of noise occurring due to a relative distance to the reader, and a detection data processing device including the dual band RFIC tag.

2. RELATED ART

Types of radio-frequency identification (RFID) are categorized into a low frequency (LF) RFID, a high frequency (HF) RFID, and an ultra-high frequency (UHF) RFID, according to a frequency of a radio wave in use for communication.

The low frequency ranges from 30 kHz to 300 kHz. Usually, an LF RFID system operates at a frequency of 125 kHz or 134.2 kHz.

The high frequency ranges from 3 MHz to 30 MHz, and a HF RFID system operates at a frequency of 13.56 MHz. The HF RFID system performs near field communication (NFC) at a frequency of 13.56 MHz.

The Ultra-high frequency ranges from 300 MHz to 3 GHz, and a UHF RFID system operates at frequencies between 860 MHz and 960 MHz.

PRIOR ART DOCUMENT

Patent Document (Patent Document 1) Korean Patent No. 10-1602784 (published on Mar. 11, 2016)
(Patent Document 2) Korean Patent No. 10-1528632 (published on Jun. 17, 2015)
(Patent Document 3) Korean Patent No. 10-1136160 (published on Apr. 17, 2012)

SUMMARY

An object of the present disclosure is to provide a dual band RFIC tag that is capable of transmitting to a reader an RF signal corresponding to an output voltage of a rectifier or an output voltage of a sensor that are subject to a magnitude of noise occurring due to a relative distance to the reader, and a detection data processing device including the dual band RFIC tag, and a detection data processing device including the dual band RFIC tag.

Another object of the present disclosure is to provide a computer program that is executed on a reader, the computer program being capable of calibrating a value of an analog detection signal that is output from a sensor, using a relationship (for example, a calibration function) between a voltage distributed according to a distance between the reader and a detection data processing device and an analog replica signal that is output from a replica sensor.

Technical Solution

According to an aspect of the present disclosure, there is provided a dual band RFID tag including: a first rectifier configured to receive and rectify a first RF signal modulated at a first frequency; a first regulator configured to regulate an output voltage of the first rectifier; a second rectifier configured to receive and rectify a second RF signal modulated at a second frequency; a second regulator configured to regulate an output voltage of the second rectifier; a voltage distributor connected to a first node and a ground in a state of being positioned therebetween, the output terminal of the first rectifier and the output terminal of the second rectifier being both connected to the first node; a multiplexer configured to output any one of an analog detection signal output from a sensor and an output signal of the voltage distributor, in response to a first selection signal or a second selection signal; and an analog-to-digital converter configured to receive as an operating voltage a voltage of a second node to which an output terminal of the first regulator and an output terminal of the second regulator are both connected and to convert an output voltage of the multiplexer into a digital signal.

According to another aspect of the present disclosure, there is provided a dual band RFID tag including: a first rectifier configured to receive and rectify a first RF signal modulated at a first frequency; a first regulator configured to regulate an output voltage of the first rectifier; a second rectifier configured to receive and rectify a second RF signal modulated at a second frequency; a second regulator configured to regulate an output voltage of the second rectifier; a voltage distributor connected to a first node and a ground in a state of being positioned therebetween, the output terminal of the first rectifier and the output terminal of the second rectifier being both connected to the first node; a replica sensor configured to generate an analog replica signal; a multiplexer configured to output any one of an analog detection signal output from a sensor, the analog replica signal, and an output signal of the voltage distributor, in response to a first selection signal or a second selection signal; and an analog-to-digital converter configured to receive as an operating voltage a voltage of a second node to which an output terminal of the first regulator and an output terminal of the second regulator are both connected and to convert an output voltage of the multiplexer into a digital signal.

According to still another aspect of the present disclosure, there is provided a detection data processing device including: a dual band RFID tag; and a sensor connected to the dual band RFID tag, wherein the dual band RFID tag including: a first rectifier configured to receive and rectify a first RF signal modulated at a first frequency; a first regulator configured to regulate an output voltage of the first rectifier; a second rectifier configured to receive and rectify a second RF signal modulated at a second frequency; a second regulator configured to regulate an output voltage of the second rectifier; a voltage distributor connected to a first node and a ground in a state of being positioned therebetween, the output terminal of the first rectifier and the output terminal of the second rectifier being both connected to the first node; a multiplexer configured to output any one of an analog detection signal output from the sensor and an output signal of the voltage distributor, in response to a first selection signal or a second selection signal; and an analogto-digital converter configured to receive as an operating voltage a voltage of a second node to which an output terminal of the first regulator and an output terminal of the second regulator are both connected and to convert an output voltage of the multiplexer into a digital signal.

According to still another aspect of the present disclosure, there is provided a detection data processing device including: a dual band RFID tag; and a sensor connected to the dual band RFID tag; wherein the dual band RFID tag including: a first rectifier configured to receive and rectify a first RF signal modulated at a first frequency; a first regulator configured to regulate an output voltage of the first rectifier; a second rectifier configured to receive and rectify a second RF signal modulated at a second frequency; a second regulator configured to regulate an output voltage of the second rectifier; a voltage distributor connected to a first node and a ground in a state of being positioned therebetween, the output terminal of the first rectifier and the output terminal of the second rectifier being both connected to the first node; a replica sensor configured to generate an analog replica signal; a multiplexer configured to output any one of an analog detection signal output from the sensor, the analog replica signal, and an output signal of the voltage distributor, in response to a first selection signal or a second selection signal; and an analog-to-digital converter configured to receive as an operating voltage a voltage of a second node to which an output terminal of the first regulator and an output terminal of the second regulator are both connected and to convert an output voltage of the multiplexer into a digital signal.

Advantageous Effects

A computer program that is executed on a reader according to an embodiment of the present disclosure is capable of calibrating a value of an analog detection signal that is output from a sensor, using a relationship (for example, a calibration function) between a voltage distributed according to a distance between the reader and a detection data processing device and an analog replica signal that is output from a replica sensor.

BRIEF DESCRIPTION OF DRAWINGS

A Brief description of the drawings is provided to facilitate a more sufficient understanding of the drawings that are referred to for detailed description of the present disclosure.

DETAILED DESCRIPTION

Figure 1:
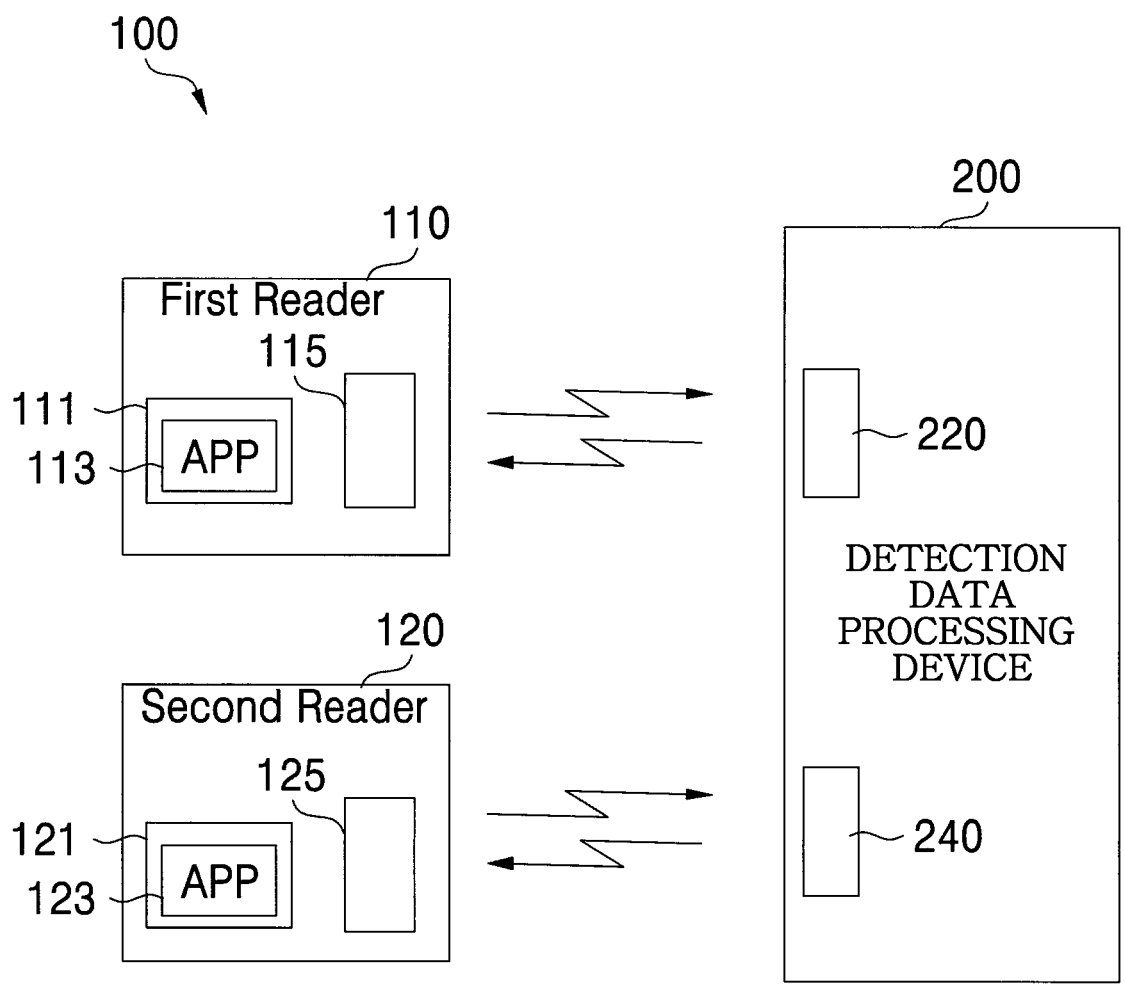
FIG. 1 is a block diagram illustrating a detection data processing system according to an embodiment of the present disclosure.

FIG. 1 is a block diagram illustrating a detection data processing system 100 according to an embodiment of the present disclosure. With reference to FIG. 1, the detection data processing system (or RFID system) 100 includes a first reader 110, a second reader 120, and a detection data processing device 200.

The first reader 110 and the second reader 120 are selected from among an LF RFID reader, an HF RFID reader, and a UHF RFID reader in a mutually exclusive manner.

The detection data processing device 200 may communicate with the first reader 110 or the second reader 120 in compliance with a corresponding RFID protocol. The detection data processing device 200 may be a wireless Internet-of-Things (IoT) apparatus.

Figure 2:
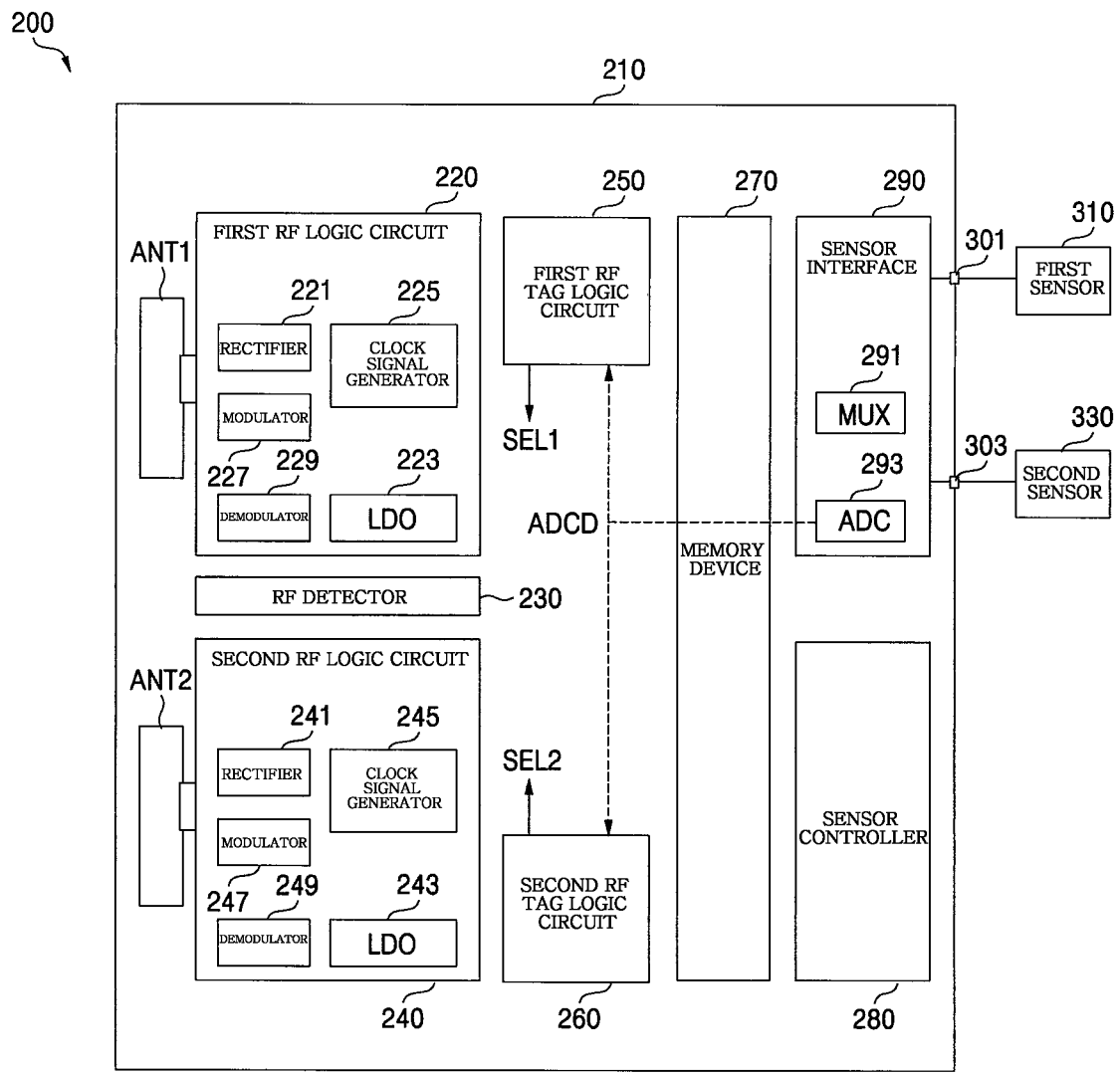
FIG. 2 is a block diagram illustrating a detection data processing device illustrated in FIG. 1.
Figure 3:
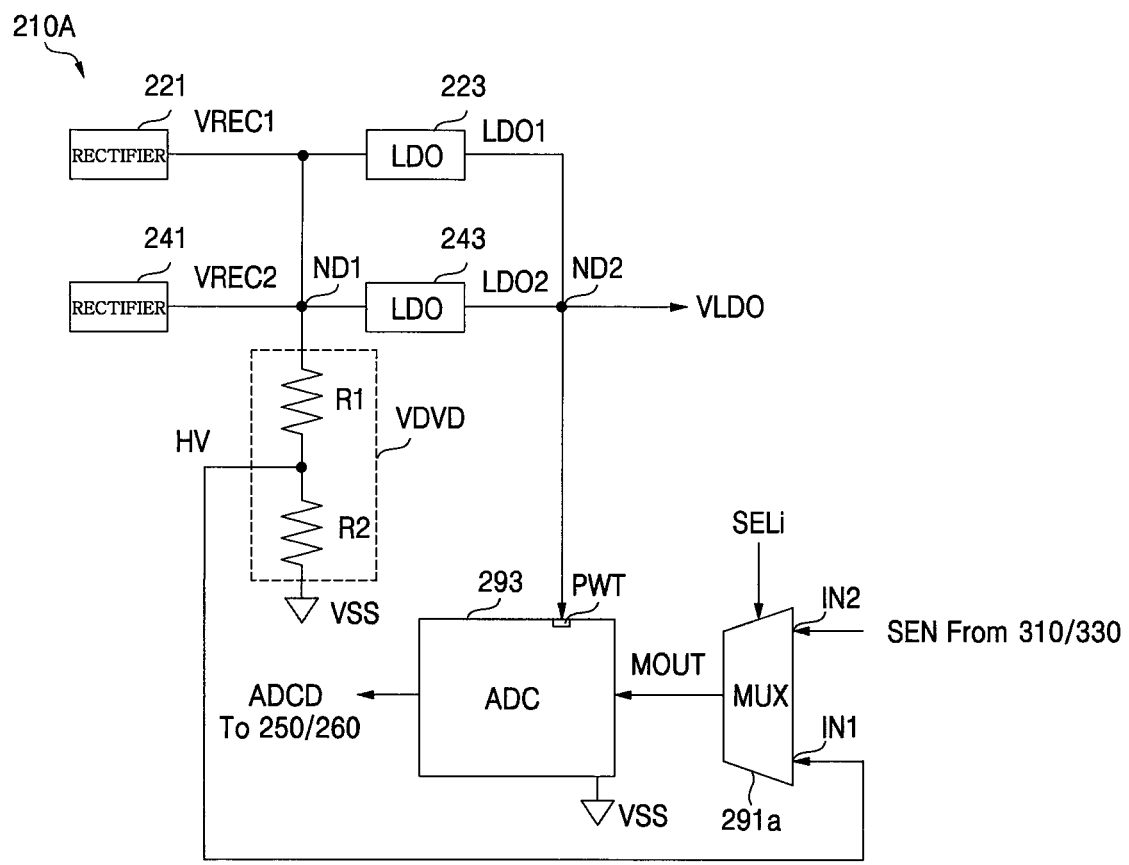
FIG. 3 is a diagram illustrating an implementation example of a transmission control circuit included in the detection data processing device in FIG. 2.
Figure 5:
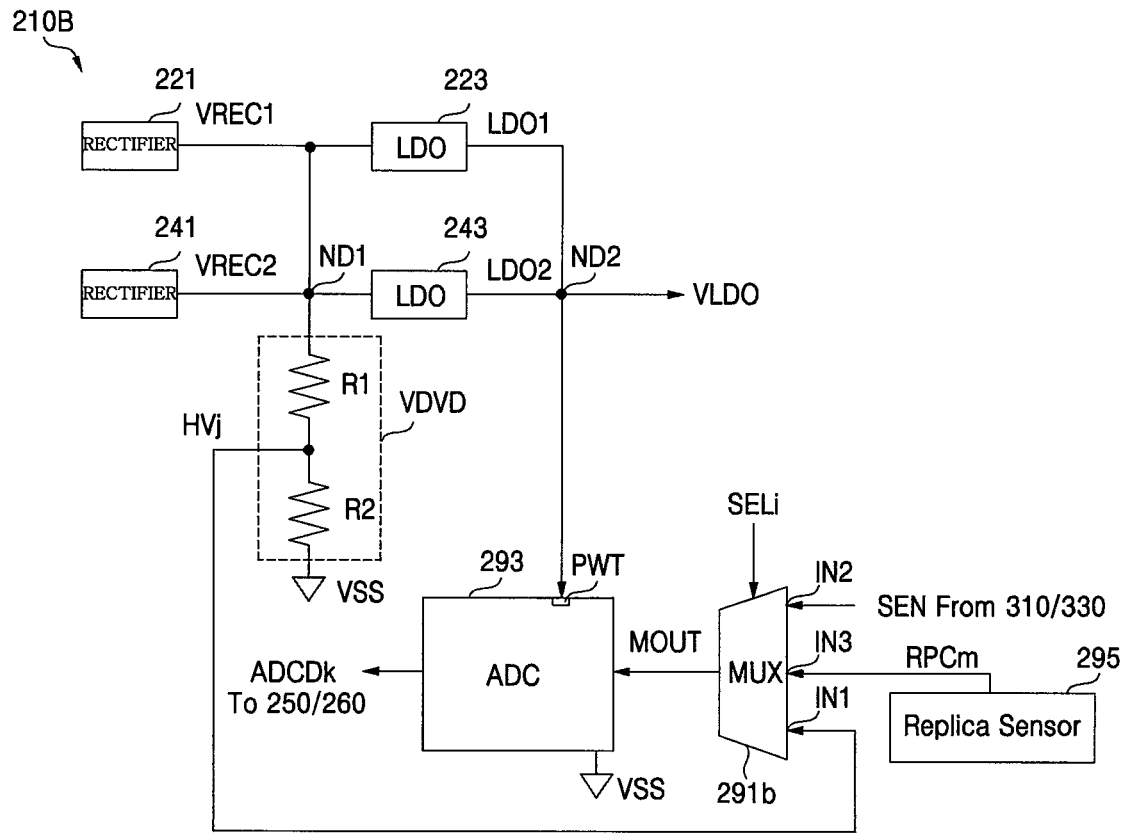
FIG. 5 is a diagram illustrating another implementation example of the transmission control circuit illustrated in the detection data processing device in FIG. 2.

FIG. 2 is a block diagram illustrating the detection data processing device 200 illustrated in FIG. 1. FIG. 3 is a diagram illustrating an implementation example of a transmission control circuit included in the detection data processing device 200 in FIG. 2. FIG. 5 is a diagram illustrating another implementation example of the transmission control circuit illustrated in the detection data processing device 200 in FIG. 2.

With reference to FIG. 1, the detection data processing device 200 is also referred to as an RFID sensor tag or an RFID tag device. The detection data processing device 200 includes a dual band RFID tag (or integrated circuit) 210, a first sensor 310 connected to a first pin 301, and a second sensor 330 connected to a second pin 303.

The first reader 110 includes a first processor 111 that executes a first computer program 113 and a first communication device 115 that is communicable with a first RF logic circuit 220 of the dual band RFID tag 210 using a first RF signal having a first frequency (or a first RF signal modulated at a first frequency).

The second reader 120 includes a second processor 121 that executes a second computer program 123 and a second communication device 125 that is communicable with a second RF logic circuit 240 of the dual band RFID tag 210 using a second RF signal having a second frequency (or a second RF signal modulated at a second frequency. The first and second communication devices 115 and 125 each include a transmission and reception circuit and an antenna.

Figure 7:
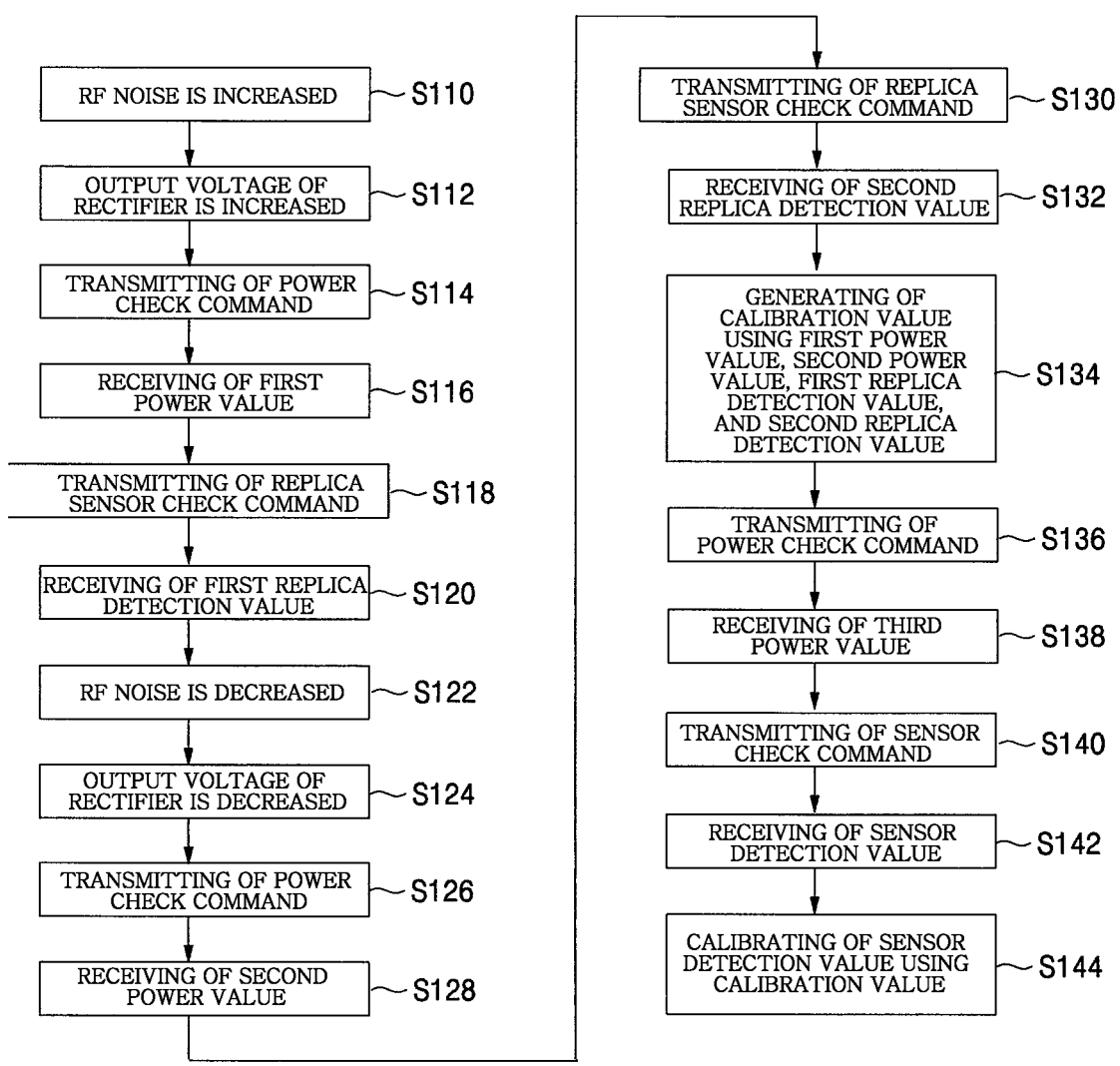
FIG. 7 is a flowchart that is referred to for description of the operation of the detection data processing system illustrated in FIG. 1.

The first and second computer programs 113 and 123 may be application programs that perform operations that are described with reference to FIGS. 7 and 8. The first and second programs 113 and 123 are stormed in storage mediums (for example, memory devices) included in the first and second readers 110 and 120, respectively, and are executed by the first and second processors 111 and 121, respectively.

With reference to FIG. 2, the dual band RFID tag 210 includes a first antenna ANT1, the first radio frequency (RF) logic circuit 220, an RF detector 230, a second antenna ANT2, the second RF logic circuit 240, a first RF tag logic circuit 250, a second RF tag logic circuit 260, a memory device 270, a sensor controller 280, and a sensor interface 290.

The dual band RFID tag 210 may be a passive RFID tag that does not include a battery, but an external battery may be optionally connected to the dual band RFID tag 210. The first and second antennas ANT1 and ANT2 may be coil antennas or loop antennas.

It is assumed that the first frequency (or first frequency band) that is used for communication between the first communication device 115 of the first reader 110 and the first RF logic circuit 220, and the second frequency (or second frequency band) that is used for communication between the second communication device 125 of the second reader 120 and the second RF logic circuit 240 are selected from among an LF (or LF band), a HF (or HF band), and a UHF (or UHF) in a mutually exclusive manner. For example, the LF may be 125 kHz or 134.2 kHz, the HF may be 13.56 MHz, and the UHF may be 900 MHz.

In addition, it is assumed that the first reader 110 and the second reader 120 do not communicate with the detection data processing device 200 at the same time.

The first RF logic circuit 220 that is communicable with the first reader 110 using the first frequency includes a first rectifier 221, a first low-dropout regulator 223, a first clock signal generator 225, a first modulator 227, and a first demodulator 229.

The first rectifier 221 receives a first RF reception (Rx) signal modulated at the first frequency from the first antenna ANT1 and outputs a first rectification voltage VREC1 generated by rectifying the received first RF reception (Rx) signal to the first LDO 223.

The first LDO 223 generates first LDO output voltage LDO1 by regulating the first rectification voltage VREC1 and supplies the generated first LDO output voltage LDO1 to at least one of the first clock signal generator 225, the first modulator 227, the first demodulator 229, the first RF tag logic circuit 250, the memory device 270, the sensor controller 280, the sensor interface 290, the first sensor 310, and the second sensor 330.

The first clock signal generator 225 supplies a first clock signal to at least one of the first RF tag logic circuit 250, the memory device 270, the sensor controller 280, and the sensor interface 290.

The first modulator 227 generates a first RF transmission (Tx) signal transmitted from the first RF tag logic circuit 250, and transmits the generated first RF Tx signal to the first communication device 115 of the first reader 110 through the first antenna ANT1.

The first demodulator 229 demodulates the first RF Rx signal that is output from the first antenna ANT1 or the first rectifier 221 and transmits the demodulated first RF Rx signal to the first RF tag logic circuit 250.

When the detection data processing device 200 reaches a communication range of the first reader 110, the RF detector 230 receives the first RF Rx signal modulated at the first frequency from the first antenna ANT1 or the first rectifier 221 and performs operations of enabling the first RF logic circuit 220 and disabling the second RF logic circuit 240.

In addition, when the detection data processing device 200 reaches a communication range of the second reader 120, the RF detector 230 receives a second RF Rx signal modulated at the second frequency from the second antenna ANT2 or a second rectifier 241 and performs operations of disabling the first RF logic circuit 220 and enabling the second RF logic circuit 240.

For example, the RF detector 230 may detect (or determine) whether the first RF Rx signal or the second RF Rx signal is received. When the first RF Rx signal is detected, the RF detector 230 may transmit the first RF Rx signal to the first RF logic circuit 220. When the second RF Rx signal is detected, the RF detector 230 may transmit the second RF Rx signal to the second RF logic circuit 240.

The second RF logic circuit 240 that is communicable with the second frequency using the second reader 120 includes the second rectifier 241, a second LDO 243, a second clock signal generator 245, a second modulator 247, and a second demodulator 249.

The second rectifier 241 receives the second RF Rx signal modulated at the second frequency from the second antenna ANT2 and outputs a second rectification voltage VREC2 generated by rectifying the received second RF Rx signal to the second LDO 243.

The second LDO 243 generates a second LDO output voltage LDO2 by regulating the second rectification voltage VREC2 and supplies the generated second LDO output voltage LDO2 to at least one of the first clock signal generator 245, the first modulator 247, the first demodulator 249, the first RF tag logic circuit 250, the memory device 270, the sensor controller 280, the sensor interface 290, the first sensor 310, and the second sensor 330.

The second clock signal generator 245 supplies a second clock signal to at least one of the second RF tag logic circuit 260, the memory device 270, the sensor controller 280, and the sensor interface 290.

The second modulator 247 generates a second RF Tx signal having the second frequency, using a second Tx signal transmitted from the second RF tag logic circuit 260, and transmits the generated second RF Tx signal to the second communication device 125 of the second reader 120 through the second antenna ANT2.

The second demodulator 249 demodulates the second RF Rx signal that is output from the second antenna ANT2 or the second rectifier 241 and transmits the demodulated second RF Rx signal to the second RF tag logic circuit 260.

When the first RF logic circuit 220 is enabled, the first RF tag logic circuit 250 interprets (interpreting is also referred to as decoding) a command included in the first RF Rx signal transmitted from the first demodulator 229 and, according to a result of the interpreting, generates a first control signal for controlling operation of the sensor controller 280.

Figure 4:
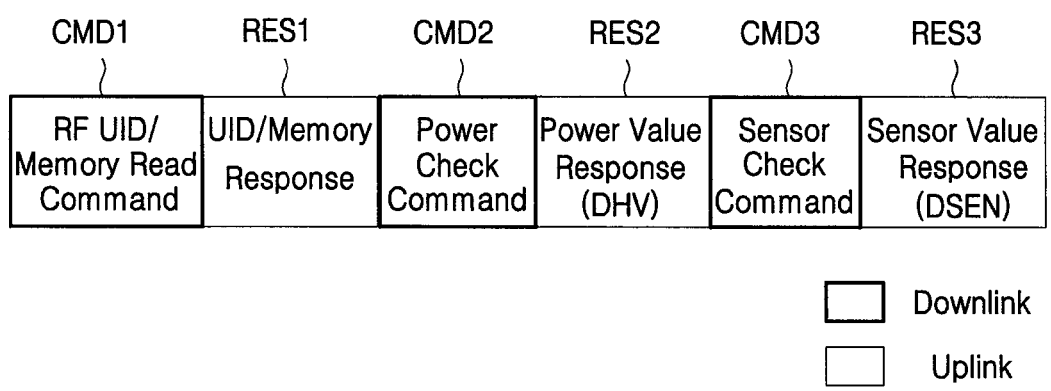
FIG. 4 is a diagram illustrating an implementation example of an RF signal packet that is referred to for description of operation of the detection data processing system, illustrated in FIG. 1, that includes the transmission control circuit illustrated in FIG. 3.
Figure 6:
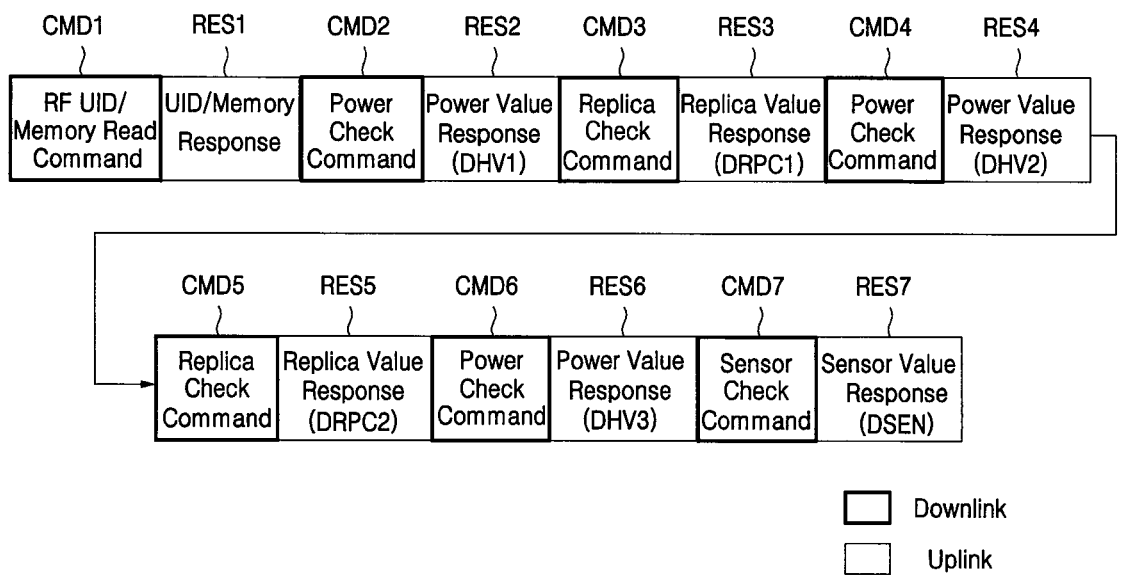
FIG. 6 is a diagram illustrating an implementation example of the RF signal packet that is referred to for description of the detection data processing system, illustrated in FIG. 1, which includes the transmission control circuit illustrated in FIG. 5.

At this point, a command that is generated by the first computer program 113 may be among commands CMD1, CMD2, and CMD3 that are illustrated in FIG. 4 or may be among commands CMD1, CMD2, CMD3, CMD4, CMD5, CMD6, and CMD7 that are illustrated in FIG. 6. The first control signal collectively refers to control signals for controlling the operation of the sensor controller 280.

The corresponding first or second computer program 113 or 123 sequentially generates the commands CMD1, CMD2, and CMD3 that are illustrated in FIG. 4 or the commands CMD1, CMD2, CMD3, CMD4, CMD5, CMD6, and CMD7 that are illustrated in FIG. 6 and transmits the generated commands to the detection data processing device 200 through the first or second communication device 115 or 125.

In addition, the first RF tag logic circuit 250 generates the first Tx signal using a digital signal transmitted from the sensor controller 280. At this point, the first Tx signal may be an RF signal corresponding to each of the responses RES1, RES2, and RES3 that are illustrated in FIG. 4 or may be an RF signal corresponding to each of the responses RES1, RES2, RES3, RES4, RES5, RES6, and REST.

When the second RF logic circuit 240 is enabled, the second RF tag logic circuit 260 interprets a command included in the second RF Rx signal transmitted from the second demodulator 249 and, according to a result of interpreting, generates a second control signal for controlling the operation of the sensor controller 280.

At this point, a command that is generated by the second computer program 123 may be among the commands CMD1, CMD2, and CMD3 or may be among the commands CMD1, CMD2, CMD3, CMD4, CMD5, CMD6, and CMD7 that are illustrated in FIG. 6. The second control signal collectively refers to the control signals for controlling the operation of the sensor controller 280.

In addition, the second RF tag logic circuit 260 generates the second Tx signal using the digital signal transmitted from the sensor controller 280. At this point, the second Tx signal may be an RF signal corresponding to each of the responses RES1, RES2, and RES3 that are illustrated in FIG. 4 or may be an RF signal corresponding to each of the responses RES1, RES2, RES3, RES4, RES5, RES6, and REST.

The memory device 270 may a non-volatile memory device, such as an electrically erasable programmable read-only memory (EEPROM). Stored in the memory device 270 are a unique identifier (UID) of the detection data processing device 200, data generated (or to be used) by the first RF tag logic circuit 250, data generated (or to be used) by the second RF tag logic circuit 260, and/or data generated (or to be used) by the sensor controller 280. The data that are generated by the sensor controller 280 may be data that are generated from output signals of the first and second sensors 310 and 330.

The memory device 270 is shared by the first RF tag logic circuit 250 and the second RF tag logic circuit 260. The sharing here means that each of the first RF tag logic circuit 250 and the second RF tag logic circuit 260 may access the memory device 270 in order to store data in the memory device 270 or to read data stored in the memory device 270 (for example, may performs operations of writing and reading data to and from the memory device 270).

The sensor controller 280 controls operations of the first and second sensors 310 and 330 through the sensor interface 290 according to the first control signal transmitted from the first RF tag logic circuit 250 and controls the operations of the first and second sensors 310 and 330 through the sensor interface 290 according to the second control signal transmitted from the second RF tag logic circuit 260.

The operations here include operations of executing control for enabling and disabling of the first and second sensors 310 and 330, operations of transmitting analog detection signals that are output from the first and second sensors 310 and 330, respectively, to the sensor controller, and the like.

The first sensor 310 may be a glucose sensor for measuring blood glucose, but not limited thereto and the second sensor 330 may be a temperature sensor, but not limited thereto.

The detection data processing device 200 is manufactured to a small size and is placed into a capsule. Then, the detection data processing device 200 may be inserted into the human body or the animal body.

FIG. 3 is a diagram illustrating an implementation example of a transmission control circuit 210A included in the detection data processing device in FIG. 2.

The transmission control circuit 210A includes the first rectifier 221, the first LDO 223, the second rectifier 241, the second LDO 243, a voltage distributor VDVD, a multiplexer 291a, and an analog-to-digital converter (ADC) 293. The multiplexer 291a in FIG. 3 is an implementation example of a multiplexer 291 in FIG. 2.

An output terminal of the first rectifier 221 and an output terminal of the second rectifier 241 are both connected to a first node ND1.

The voltage distributor VDVD is connected to the first node ND1 and a ground VSS in a state of being positioned therebetween, distributes a voltage between resistors R1 and R2, and transmits to a first input terminal IN1 of the multiplexer 291a a voltage HV resulting from the voltage-distributing.

An output terminal of the first LDO 223 and an output terminal of the second LDO 243 are both connected to a second node ND2. A voltage VLDO of the second node ND2 is supplied to at least one of the first clock signal generator 225, the first modulator 227, the first demodulator 229, the first clock signal generator 245, the first modulator 247, the first demodulator 249, the first RF tag logic circuit 250, the second RF tag logic circuit 260, the memory device 270, the sensor controller 280, the sensor interface 290, the multiplexer 291, the ADC 293, the first sensor 310, and the second sensor 330.

When only the first RF logic circuit 220 of the first RF logic circuit 220 and the second RF logic circuit 240 is enabled by the RF detector 230, the first rectifier 221 and the first LDO 223 operate, and the second rectifier 241 and the second LDO 243 do not operate.

However, when only the second RF logic circuit 240 of the first RF logic circuit 220 and the second RF logic circuit 240 is enabled by the RF detector 230, the first rectifier 221 and the first LDO 223 do not operate, and the second rectifier 241 and the second LDO 243 operate.

In an implementation example, when an output voltage VREC1 of the first rectifier 221 or an output voltage VREC2 of the second rectifier 241 ranges from 2.4 V to 3.6 V, the first LDO output voltage LDO1 or the second LDO output voltage LDO2 may be 1.8 V, and the voltage HV resulting from the voltage-distributing may range from 1.2 V to 1.8 V.

The multiplexer 291a includes the first input terminal IN1 through an output voltage HV of the voltage distributor VDVD is received, a second input terminal IN2 through which an analog detection signal SEN that is output from the first or second sensor 310 or 330 is received, and a selection signal input terminal through which a selection signal SELi (i is a natural number) is received.

The multiplexer 291a transmits any one of the voltage HV resulting from the voltage-distributing, and the analog detection signal SEN, as an output signal MOUT, to the ADC 293, according to a first selection signal SELi (i=1) that is output from the first RF logic circuit 220 and a second selection signal SELi (i=2) that is output from the second RF logic circuit 240.

The ADC 293 is connected to the second node ND2 and the ground VSS in a state of being positioned therebetween, includes an operation voltage terminal PWT through which a voltage (VLDO=LDO1 or VLDO=LDO2) of the second node ND2 is received, converts into a digital signal ADCD an analog signal MOUT that is outp8ut from the multiplexer 291a, according a resolution of the ADC 293, and outputs the resulting digital signal ADCD to the corresponding first or second RF tag logic circuit 250 or 260.

FIG. 4 is a diagram illustrating an implementation example of an RF signal packet that is referred to for description of operation of the detection data processing system 100, illustrated in FIG. 1, that includes the transmission control circuit 210A illustrated in FIG. 3.

With reference to FIGS. 1 to 4, if a user positions the first reader 110 closely to the detection data processing device 200 (this action is also referred to as tagging or scan) at a first point in time, the first reader 110 transmits a first command CMD1, as an RF signal, to the detection data processing device 200.

The first command CMD1 is transmitted to the first RF tag logic circuit 250 through the first antenna ANT1 and the first demodulator 229. When the first command CMD1 is an RF UID transmission command, the first RF tag logic circuit 250 reads the UID stored in the memory device 270 and transmits a first response signal RES1 including the UID to the first communication device 115 of the first reader 110 through the first modulator 227 and the first antenna ANT1.

When the first command CMD1 is a memory read command, the first RF tag logic circuit 250 reads data stored in the memory device 270 and transmits the first response signal RES1 including the data, to the first communication device 115 of the first reader 110 through the first modulator 227 and the first antenna ANT1.

Thereafter, the first reader 110 transmits a second command CMD2, as an RF signal, to the detection data processing device 200.

The second command CMD2 is transmitted to the first RF tag logic circuit 250 through the first antenna ANT1 and the first demodulator 229. When the second command CMD2 is a power check command, the first RF tag logic circuit 250 generates a first selection signal SEL1 having a first level (for example, a low level) and transmits the generated first selection signal SEL1 to the multiplexer 291a.

The voltage distributor VDVD voltage-distributes the first rectification voltage VREC1 of the first rectifier 221 and thus generates the voltage HV resulting from the voltage-distributing. Accordingly, in response to the first selection signal SEL1 having the low level, the multiplexer 291a transmits the voltage, resulting from the voltage-distributing, which is input into the first input terminal IN1, to the ADC 293 through an output terminal.

The ADC 293 generates a digital signal (ADCD=DHV) and transmits the generated digital signal (ADCD=DHV) to the first RF tag logic circuit 250. The first RF tag logic circuit 250 transmits a second response signal RES2 including the digital signal (ADCD=DHV), to the first communication device 115 of the first reader 110 through the first modulator 227 and the first antenna ANT1.

Thereafter, the first reader 110 transmits a third command CMD3, as an RF signal, to the detection data processing device 200.

The third command CMD3 is transmitted to the first RF tag logic circuit 250 through the first antenna ANT1 and the first demodulator 229. When the third command CMD3 is a sensor check command, the first RF tag logic circuit 250 generates the first selection signal SEL1 having a second level (for example, a high level), transmits the generated first selection signal SEL1 to the multiplexer 291a, and transmits the first control signal to the sensor controller 280.

The sensor controller 280 enables the first sensor 310 according to the first control signal. Accordingly, the enabled first sensor 310 generates the analog detection signal SEN.

In response to the first selection signal SEL1 having the high level, the multiplexer 291a transmits the analog detection signal SEN that is input into the second input terminal IN2, to the ADC 293 through the output terminal.

The ADC 293 generates a digital signal (ADCD=DSEN) corresponding to the analog detection signal SEN and transmits the generated digital signal (ADCD=DSEN) to the first RF tag logic circuit 250. The first RF tag logic circuit 250 transmits a third response signal RES3 including the digital signal (ADCD=DSEN), to the first communication device 115 of the first reader 110 through the first modulator 227 and the first antenna ANT1. Each of the first, second, and third response signals RES1 RES2, and RES3 corresponds to an RF signal that results from modulating the first Tx signal, output from the first RF tag logic circuit 250, onto the first frequency.

The first computer program 113 that is executed on the first processor 111 receives and processes each of the first, second, and third signals RES1, RES2, and RES that are output from the first communication device 115.

Each of the first, second, and third CMD1, CMD2, and CMD3 is a radio frequency (RF) signal that is transmitted over the downlink from the first reader 110 to the detection data processing device 200. Each of the first, second, and third response signals RES1, RES2, and RES3 is an RF signal associated with the first Tx signal that is output over the uplink from the first RF tag logic circuit 250.

In another implementation example, if the user positions the second reader 120 closely to the detection data processing device 200 at a second point in time that is later than the first point in time, the second reader 120 transmits the first command CMD1, as an RF signal, to the detection data processing device 200.

The first command CMD1 is transmitted to the second RF tag logic circuit 260 through the second antenna ANT2 and the second demodulator 249. When the first command CMD1 is the RF UID transmission command, the second RF tag logic circuit 260 reads an UID stored in the memory device 270 and transmits the first response signal RES1 including the UID, to the second communication device 125 of the second reader 120 through the second modulator 247 and the second antenna ANT2.

When the first command CMD1 is a memory read command, the second RF tag logic circuit 260 reads data stored in the memory device 270 and transmits the first response signal RES1 including the data, to the second communication device 125 of the second reader 120 through the second modulator 247 and the second antenna ANT2.

Thereafter, the second reader 120 transmits the second command CMD2, as an RF signal, to the detection data processing device 200.

The second command CMD2 is transmitted to the second RF tag logic circuit 260 through the second antenna ANT2 and the second demodulator 249. When the second command CMD2 is a power check command, the second RF tag logic circuit 260 generates a second selection signal SEL2 having the first level (for example, the low level) and transmits the generated second selection signal SEL2 to the multiplexer 291a.

The voltage distributor VDVD voltage-distributes the second rectification voltage VREC2 of the second rectifier 241 and generates the voltage HV resulting from the voltage-distributing. Accordingly, in response to the second selection signal SEL2 having the low level, the multiplexer 291a transmits the voltage HV resulting from the voltage-distributing, to the ADC 293.

The ADC 293 generates the digital signal (ADCD=DHV) corresponding to the voltage HV from the voltage-distributing and transmits the generated digital signal (ADCD=DHV) to the second RF tag logic circuit 260. The second RF tag logic circuit 260 transmits the second response signal RES2 including the digital signal (ADCD=DHV), to the second communication device 125 of the second reader 120 through the second modulator 247 and the second antenna ANT2.

Thereafter, the second reader 120 transmits the third command CMD3, as an RF signal, to the detection data processing device 200.

The third command CMD3 is transmitted to the second RF tag logic circuit 260 through the second antenna ANT2 and the second demodulator 249. When the third command CMD3 is the sensor check command, the second RF tag logic circuit 260 generates the second selection signal SEL2 having the second level, transmits the generated second selection signal to the multiplexer 291a, and transmits the second control signal to the sensor controller 280.

The sensor controller 280 enables the first sensor 310 according to the second control signal. Accordingly, the enabled first sensor 310 generates the analog detection signal SEN.

In response to the second selection signal SEL2 having the high level, the multiplexer 291a transmits the analog detection signal SEN to the ADC 293.

The ADC 293 generates the digital signal (ADCD=DSEN) corresponding to the analog detection signal SEN and transmits the generated digital signal (ADCD=DSEN) to the second RF tag logic circuit 260. The second RF tag logic circuit 260 transmits the third response signal RES3 including the digital signal ADCD=DSEN, to the second communication device 125 of the second reader 120 through the second modulator 247 and the second antenna ANT2. Each of the first, second, and third response signals RES1, RES2, and RES3 is an RF signal corresponding to the second Tx signal that is output from the second RF tag logic circuit 260.

The second computer program 123 that is executed on the second processor 121 receives and processes each of the first, second, and third response signals RES1, RES2, and RES that are output from the second communication device 125.

Each of the first, second, and third command CMD1, CMD2, and CMD3 is an RF signal that is transmitted over the downlink from the second reader 120 to the detection data processing device 200. Each of the first, second, and third response signals RES1, RES2, and RES3 is an RF signal associated with the second Tx signal that is output over the uplink from the second RF tag logic circuit 260.

FIG. 5 is a diagram illustrating another implementation example of the transmission control circuit illustrated in the detection data processing device in FIG. 2.

A transmission control circuit 210B includes the first rectifier 221, the first LDO 223, the second rectifier 241, the second LDO 243, the voltage distributor VDVD, a multiplexer 291b, the ADC 293, and a replica sensor 295. The multiplexer 291b in FIG. 5 is another implementation example of the multiplexer 291 in FIG. 2.

The structure and operation of the transmission control circuit 210A are the same as those of the transmission control circuit 210B in FIG. 5 except for the multiplexer 291b and the replica sensor 295. Therefore, the detailed descriptions of the first rectifier 221, the first LDO 223, the second rectifier 241, the second LDO 243, the voltage distributor VDVD, and the ADC 293 are not repeated.

It is assumed that a structure and feature of the replica sensor 295 are the same as those of the first sensor 310.

The multiplexer 291b includes the first input terminal IN1 through which an output voltage HVj (j is a natural number) of the voltage distributor VDVD is received, the second input terminal IN2 through which the analog detection signal SEN that is output from the first or second sensor 310 or 330 is received, a third input terminal IN3 through which an analog replica signal RPC that is output from the replica sensor 295 is received, and the selection signal input terminal through which the selection signal SELi is received.

The multiplexer 291b transmits any one of the voltage HVj resulting from the voltage-distributing, the analog detection signal SEN, and the analog replica signal RPC, as the output signal MOUT, to the ADC 293, according to the first selection signal SEL that is output from the first RF logic circuit 220 and to the second selection signal SEL2 that is output from the second RF logic circuit 240.

FIG. 6 is a diagram illustrating an implementation example of the RF signal packet that is referred to for description of the detection data processing system 100, illustrated in FIG. 1, which includes the transmission control circuit 210B illustrated in FIG. 5. FIG. 7 is a flowchart that is referred to for description of the operation of the detection data processing system 100 illustrated in FIG. 1. FIG. 8 is a graph that is referred to for description of a method of correcting a sensor detection value using a program installed on each of the first and second readers 110 and 120.

Figure 8:
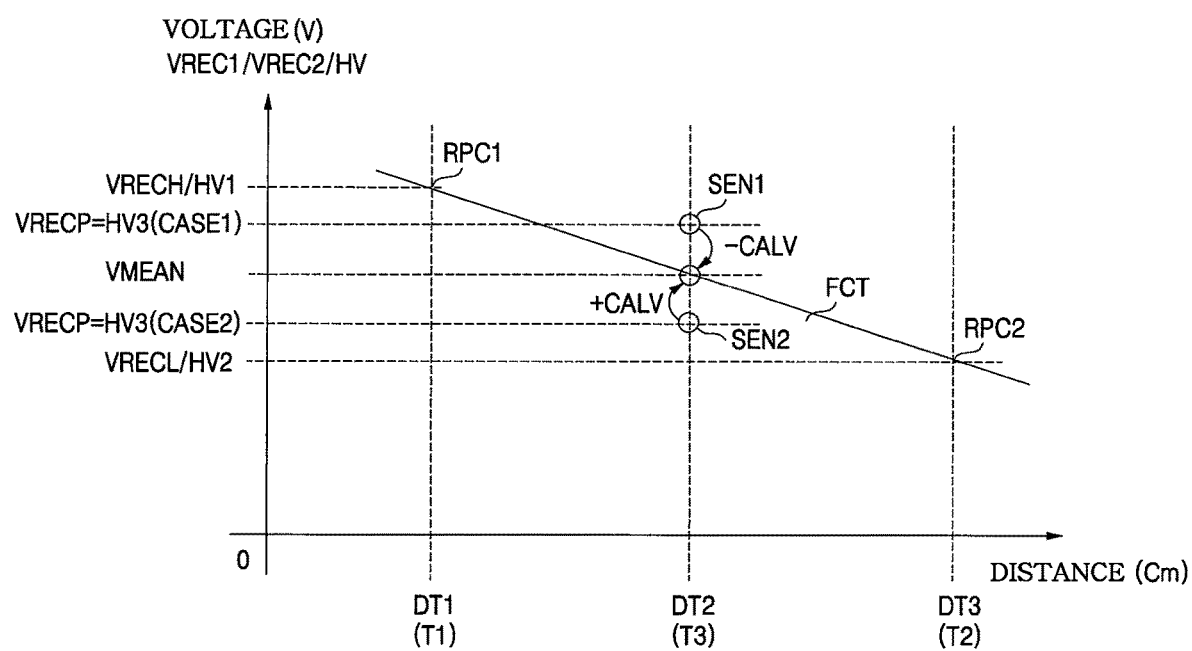
FIG. 8 is a graph that is referred to for description of a method of correcting a sensor detection value using a program installed on each of the first and second readers.

In FIG. 8, analog signals are illustrated for convenience in description. However, application to digital signals that correspond to the analog signals, respectively, may also be possible in the same or similar manner.

The corresponding first or second rectification voltage VREC1 or VREC2 varies in level according to radio frequency (RF) noise. The analog detection signal detected by each of the first and second sensor 310 and 330 also varies in level according to the variation of the corresponding first or second rectification voltage VREC1 or VREC2 in level.

That is, although the first or second sensor 310 or 330 performs detection in the same detection environment, the analog detection signal detected by each of the first and second sensors 310 and 330 vary according to a distance (which is also referred to as a recognition distance) between each of the first and second reader 110 and 120 and the detection data processing device 200.

For example, the shorter the distance between each of the first and second readers 110 and 120 and the detection data processing device 200, or the closer each of the first and second readers 110 and 120 and the detection data processing device 200 are to each other, the more increased the RF noise. The more increased the RF noise, the higher level the corresponding first or second rectification voltage VREC1 or VREC2 has.

In addition, the longer the distance between each of the first and second readers 110 and 120 and the detection data processing device 200, the more decreased the RF noise. The more decreased the RF noise, the lower level the corresponding first or second rectification voltage VREC1 or VREC2 has. That is, the RF noise varies according to the variance in the recognition distance. Therefore, the analog detection signal SEN varies in level according to the variation in the recognition distance.

With reference to FIGS. 1 to 8, if the user positions the first reader 110 closely to the detection data processing device 200 at a first point T1 in time, a distance between the first reader 110 and the detection data processing device 200 is a first distance DT1. Accordingly, the RF noise is increased (S110), and the first rectification voltage VREC1 of the first rectifier 221 is increased.

Since the first command CMD1 and the first response signal RES1 are described above with reference to FIG. 4, descriptions thereof are omitted.

The first communication device 115 of the first reader 110 transmits the second command CMD2 modulated at the first frequency, as an RF signal, to the detection data processing device 200 (S114).

The second command CMD2 is transmitted to the first RF tag logic circuit 250 through the first antenna ANT1 and the first demodulator 229. When the second command CMD2 is the power check command, the first RF tag logic circuit 250 generates the first selection signal SEL1 having a first bit value (for example, 01) and transmits the generated first selection signal SEL1 to the multiplexer 291b.

At the first distance DT1, the voltage distributor VDVD voltage-distributes the first rectification voltage (VREC1=VRECH) of the first rectifier 221 and generates the voltage HVj (j=1) from the voltage-distributing. Accordingly, in response to the first selection signal SEL1 having the first bit value, the multiplexer 291b transmits a voltage HV1 from the voltage-distributing that is input into the first input terminal IN1, as the output signal MOUT to the ADC 293.

The ADC 293 generates a second digital signal ADCDk (k=2) corresponding to the voltage HV1 from the voltage-distributing and transmits the generated second digital signal ADCDk (k=2) to the first RF tag logic circuit 250. The first RF tag logic circuit 250 transmits the second response signal RES2 including the second digital signal (ADCD2=DHV1), to the first communication device 115 of the first reader 110 through the first modulator 227 and the first antenna ANT1. The first computer program 113 on the first reader 110 receives a first power value corresponding to the second digital signal (ADCD2=DHV1) (S116).

Thereafter, the first reader 110 transmits the third command CMD3 modulated at the first frequency, as an RF signal, to the detection data processing device 200 (S118).

The third command CMD3 is transmitted to the first RF tag logic circuit 250 through the first antenna ANT1 and the first demodulator 229.

In an implementation example, when the third command CMD3 is a replica sensor check command, the first RF tag logic circuit 250 generates the first selection signal SEL1 having a second bit value (for example, 11), transmits the generated first selection signal SEL1, and transmits the first control signal to the sensor controller 280. The sensor controller 280 enables the replica sensor 295 according to the first control signal. Accordingly, the enabled replica sensor 295 generates a first analog replica signal RPCm (m=1).

In another implementation example, when the third command CMD3 is the replica sensor check command, the first RF tag logic circuit 250 generates the first selection signal SEL1 having the second bit value, transmits the generated first selection signal SEL1 to the multiplexer 291b, and may not transmit to the sensor controller 280 the first control signal for instructing the controller 280 to enable the replica sensor 295.

In response to the first selection signal SEL1 having the second value, the multiplexer 291b transmits the first analog replica signal RPC1 that is input into the second input terminal IN2, as the output signal MOUT, to the ADC 293.

The ADC 293 generates a third digital signal ADCDk (k=3) corresponding to the first analog replica signal RPC and transmits the generated third digital signal ADCDk (k=3) to the first RF tag logic circuit 250. The first RF tag logic circuit 250 transmits the third response signal RES3 including the third digital signal (ADCD3=DRPC1), to the first communication device 115 of the first reader 110 through the first modulator 227 and the first antenna ANT1.

The first computer program 113 on the first reader 110 receives a first replica detection value corresponding to the third digital signal (ADCD3=DRPC1) (S120).

If the user moves the first reader 110 away from the detection data processing device 200 at the second point T2 in time that is different from the first point T1 in time, a third distance DT3 between the first reader 110 and the detection data processing device 200 is longer than the first distance DT1. Therefore, the RF noise is decreased (S122), and the first rectification voltage VREC1 of the first rectifier 221 is decreased (S124).

For example, it is desired that a measurement is performed in such a manner that the first distance DT1 is a minimum recognition distance and that the third distance DT3 is a maximum recognition distance.

The first reader 110 transmits a fourth command CMD4 modulated at the first frequency, as an RF signal, to the detection data processing device 200 (S126).

The fourth command CMD4 is transmitted to the first RF tag logic circuit 250 through the first antenna ANT1 and the first demodulator 229. When the fourth command CMD4 is the power check command, the first RF tag logic circuit 250 generates the first selection signal SEL1 having the first bit value and transmits the generated first selection signal SEL1 to the multiplexer 291b.

At the third distance DT3, the voltage distributor VDVD voltage-distributes the first rectification voltage (VREC1=VRECL and VRECH>VRECL) of the first rectifier 221, and generates the voltage HVj (j=2) resulting from the voltage-distributing. Accordingly, in response to the first selection signal SEL1 having the first bit value, the multiplexer 291b transmits the voltage HV2 (HV1>HV2) that is input into the first input terminal IN1, as the output signal MOUT, to the ADC 293.

The ADC 293 generates a fourth digital signal ADCDk (k=4) corresponding to the voltage HV2 from the voltage-distributing and transmits the generated fourth digital signal ADCDk (k=4) to the first RF tag logic circuit 250. The first RF tag logic circuit 250 transmits a fourth response signal RES4 including the fourth digital signal (ADCD4=DHV2), to the first communication device 115 of the first reader 110 through the first modulator 227 and the first antenna ANT1. The first computer program 113 on the first reader 110 receives a second power value corresponding to the fourth digital signal (ADCD4=DHV2) (S128).

The first reader 110 transmits a fifth command CMD5 modulated at the first frequency, as an RF signal, to the detection data processing device 200 (S130).

The fifth command CMD5 is transmitted to the first RF tag logic circuit 250 through the first antenna ANT1 and the first demodulator 229.

In an implementation example, when the fifth command CMD5 is the sensor check command, the first RF tag logic circuit 250 generates the first selection signal SEL1 having the second bit value, transmits the generated first selection signal SEL1 to the multiplexer 291b, and transmits the first control signal to the sensor controller 280. The sensor controller 280 enables the replica sensor 295 according to the first control signal. Accordingly, the enabled the replica sensor 295 generates the analog replica signal RPC.

In another implementation example, when the fifth command CMD5 is the replica sensor check command, the first RF tag logic circuit 250 generates the first selection signal SEL1 having the second bit value, transmits the generated first selection signal SEL1 to the multiplexer 291b, and may not transmit to the sensor controller 280 the first control signal for instructing the controller 280 to enable the replica sensor 295.

In response to the first selection signal SEL1 having the second bit value, the multiplexer 291b transmits a second analog replica signal RPCm (m=2) that is input into the second input terminal IN2, as the output signal MOUT, to the ADC 293.

The ADC 293 generates a fifth digital signal ADCDk (k=5) corresponding to the second analog replica signal RPC2 and transmits the generated fifth digital signal ADCDk (k=5) to the first RF tag logic circuit 250. The first RF tag logic circuit 250 transmits the fifth response signal RES5 including a fifth digital signal (ADCD5=DRPC2), to the first communication device 115 of the first reader 110 through the first modulator 227 and the first antenna ANT1. The first computer program 113 on the first reader 110 receives second replica detection value corresponding to the fifth digital signal ADCD5=DRPC2 (S132).

The first computer program 113 on the first reader 110 generates a calibration value or a calibration function FCT using the first power value, the second power value, the first replica detection value, and the second replica detection value (S134).

As illustrated in FIG. 8, the first computer program 113 on the first reader 110 may compute the calibration value or the calibration function FCT using a pair of the first power value, the first replica detection value and a pair of the second power value and the second replica detection value.

In implementation examples, the first computer program 113 may compute an equation of a straight line, that is, the calibration function FCT, using analog values (for example, first coordinate values HV1 and RPC1 and second coordinate values HV2 and RPC2).

In implementation examples, the first computer program 113 may compute an equation of a straight line, that is, the calibration function FCT, using digital values (for example, a pair of DHV1 and DRPC1 and a pair of DHV2 and DRPC2).

In implementation examples, the first computer program 113 may compute analog values (for example, a pair of HV1 and RPC1 and a pair of HV2 and RPC2), using digital values (for example, a pair of DHV1 and DRPC1 and a pair of DHV2 and DRPC2).

In implementation examples, the first computer 113 may compute the average of the first power value and the second power value and the average of the first replica detection value and the second replica detection value.

In the steps S110 and S134, the first computer program 113 may compute the calibration value or the calibration function FCT that is necessary for correction when the first reader 110 is actually used.

After the steps S110 and S134 are completely performed, at a third point T3 in time that is later than the second point T2 in time, the user moves the first reader 110 in such a manner that the distance between the first reader 110 and the detection data processing device 200 is the second distance DT2. The second distance DT2 is smaller (shorter) than the first distance DT1, and is greater (longer) than the third distance DT3.

The first reader 110 transmits a sixth command CMD6, as an RF signal, to the detection data processing device 200 (S136).

The sixth command CMD6 is transmitted to the first RF tag logic circuit 250 through the first antenna ANT1 and the first demodulator 229. When the sixth command CMD6 is the power check command, the first RF tag logic circuit 250 generates the first selection signal SEL1 having the first bit value and transmits the generated first selection signal SEL1 to the multiplexer 291b.

At the second distance DT2, the voltage distributor VDVD voltage-distributes the first rectification voltage (VREC1=VRECP) of the first rectifier 221 and generates the voltage HVj (j=3) resulting from the voltage-distributing. Accordingly, in response to the first selection signal SEL1 having the first bit value, the multiplexer 291b transmits a voltage HV3 (HV1>HV3>HV2) resulting from the voltage-distributing, which is input into the first input terminal IN1, to the ADC 293 through an output terminal.

The ADC 293 generates a sixth digital signal (ADCD6=DHV3) corresponding to the voltage HV3 resulting from the voltage-distributing and generates the generated sixth digital signal (ADCD6=DHV3) to the first RF tag logic circuit 250. The first RF tag logic circuit 250 transmits a sixth response signal RES6 including the sixth digital signal (ADCD6=DHV3) to the first communication device 115 of the first reader 110 through the first modulator 227 and the first antenna ANT1.

The first computer program 113 on the first reader 110 receives a third power value corresponding to the sixth digital signal (ADCD6=DHV3) (S138).

Thereafter, the first reader 110 transmits a seventh command CMD7, as an RF signal, to the detection data processing device 200 (S140).

The seventh command CMD7 is transmitted to the first RF tag logic circuit 250 through the first antenna ANT1 and the first demodulator 229. When the seventh command CMD7 is the sensor check command, the first RF tag logic circuit 250 generates the first selection signal SEL1 having a third bit value (for example, 10), transmits the generated first selection signal SEL1 to the multiplexer 291b, and transmits the first control signal to the sensor controller 280.

The sensor controller 280 enables the first sensor 310 according to the first control signal. Accordingly, the enabled first sensor 310 generates the analog detection signal SEN.

In response to the first selection signal SEL1 having the third bit value, the multiplexer 291b transmits the analog detection signal SEN that is input into the third input terminal IN3, to the ADC 293 through the output terminal.

The ADC 293 generates a seventh digital signal ADCDk (k=7) corresponding to the analog detection signal SEN and transmits the generated seventh digital signal ADCDk (k=7) to the first RF tag logic circuit 250. The first RF tag logic circuit 250 transmits a seventh response signal REST including the seventh digital signal (ADCD7=DSEN) to the first communication device 115 of the first reader 110 through the first modulator 227 and the first antenna ANT1.

The first computer program 113 on the first reader 110 receives a sensor detection value corresponding to the seventh digital signal (ADCD7=DSEN) (S142).

The first computer program 113 on the first reader 110 calibrates the sensor detection value using the calibration value CALV or the calibration function FCT that is computed in the step S134 (S144).

For example, when a level of the voltage HV3 resulting from the voltage-distributing, which corresponds to the sixth digital signal (ADCD6=DHV3) transmitted from the detection data processing device 200 at the second distance DT2 is higher than a level of an average voltage VMEAN (CASE 1), the first computer program 113 subtracts the calibration value CALV from a sensor detection value SEN1 corresponding to the seventh digital signal (ADCD7=DSEN) and thus generates a calibrated calibration value. For example, the average voltage VMEAN may be the average of the first power value and the second power value.

However, when the level of the voltage HV3 resulting from the voltage-distributing, which corresponds to the sixth digital signal (ADCD6=DHV3) transmitted from the detection data processing device 200 at the second distance DT2 is lower than the level of the average voltage VMEAN (CASE 2), the first computer program 113 adds the calibration value CALV to a sensor detection value SEN2 corresponding to the seventh digital signal (ADCD7=DSEN and thus generates a calibrated calibration value.

The processes in which the first computer program 113 on the first reader 110 transmits each of the commands CMD1 to CMD7 to the detection data processing device 200 and receives the response signals RES1 to REST to the commands CMD1 to CMD7, respectively, from the detection data processing device 200 are described with reference to FIGS. 5 to 8. Likewise, from FIGS. 5 to 8, it can also be understandable that processes in which the second computer program 123 on the second reader 120 transmits each of the commands CMD1 to CMD7 to the detection data processing device 200 and receives the response signals RES1 to REST to the commands CMD1 to CMD7, respectively, from the detection data processing device 200 are described with reference to FIGS. 5 to 8.

As described above, the corresponding first or second computer programs 113 or 123 may calibrate actively or in real time the sensor detection value corresponding to the analog detection signal SEN that is output from the corresponding first or second sensor 310 or 330, using a relationship between the voltage VHj resulting from the voltage-distributing and the analog replica signal RPCm that is output from the replica sensor 295 (for example, using the calibration function FCT). The voltage VHj is generated by voltage-distributing the corresponding first or second rectification voltage VREC1 or VREC2 that is generated by the first or second rectifier 221 or 241 according to the distance between the corresponding first or second reader 110 or 120 and the detection data processing device 200. Therefore, a precise measurement may possibly be made.

The embodiments of the present disclosure are described with reference to the drawings, but only in an exemplary manner. It would be understandable by a person of ordinary skill in the art that various modifications are possibly made to the embodiments thereof and equivalents of the embodiments are possibly available. Therefore, the proper scope of the present disclosure should be determined by the technical idea defined in the following claims.

What is claimed is:

1. A dual band RFID tag comprising:
a first rectifier configured to receive and rectify a first RF signal modulated at a first frequency;
a first regulator configured to regulate an output voltage of the first rectifier;
a second rectifier configured to receive and rectify a second RF signal modulated at a second frequency;
a second regulator configured to regulate an output voltage of the second rectifier;
a voltage distributor connected to a first node and a ground in a state of being positioned therebetween, the output terminal of the first rectifier and the output terminal of the second rectifier being both connected to the first node;
a multiplexer configured to output any one of an analog detection signal output from a sensor and an output signal of the voltage distributor, in response to a first selection signal or a second selection signal;
an analog-to-digital converter configured to receive as an operating voltage a voltage of a second node to which an output terminal of the first regulator and an output terminal of the second regulator are both connected and to convert an output voltage of the multiplexer into a digital signal;
a first RF tag logic circuit configured to generate the first selection signal in such a manner that the multiplexer outputs the output signal of the voltage distributor, when a command included in the first RF signal is a power check command, and to generate the first selection signal in such a manner that the multiplexer outputs the analog detection signal, when the command included in the first RF signal is a sensor check command; and
a second RF tag logic circuit configured to generate the second selection signal in such a manner that the multiplexer outputs the output signal of the voltage distributor, when a command included in the second RF signal is the power check command, and to generate the second selection signal in such a manner that the multiplexer outputs the analog detection signal, when the command included in the second RF signal is the sensor check command.

2. The dual band RFID tag of claim 1, further comprising:
an RF detector configured to enable the first rectifier, the first regulator, and the first RF tag logic circuit and disable the second rectifier, the second regulator, and the second RF tag logic circuit, when only the first RF signal of the first RF signal and the second RF signal is received and to disable the first rectifier, the first regulator, and the first RF tag logic circuit and enable the second rectifier, the second regulator, and the second RF tag logic circuit, when only the second RF signal of the first RF signal and the second RF signal is received.

3. A dual band RFID tag comprising:
a first rectifier configured to receive and rectify a first RF signal modulated at a first frequency;
a first regulator configured to regulate an output voltage of the first rectifier;
a second rectifier configured to receive and rectify a second RF signal modulated at a second frequency;
a second regulator configured to regulate an output voltage of the second rectifier;
a voltage distributor connected to a first node and a ground in a state of being positioned therebetween, the output terminal of the first rectifier and the output terminal of the second rectifier being both connected to the first node;
a replica sensor configured to generate an analog replica signal;
a multiplexer configured to output any one of an analog detection signal output from a sensor, the analog replica signal, and an output signal of the voltage distributor, in response to a first selection signal or a second selection signal; and
an analog-to-digital converter configured to receive as an operating voltage a voltage of a second node to which an output terminal of the first regulator and an output terminal of the second regulator are both connected and to convert an output voltage of the multiplexer into a digital signal;
a first RF tag logic circuit configured to generate the first selection signal in such a manner that the multiplexer outputs the output signal of the voltage distributor, when a first command included in the first RF signal is a power check command, to generate the first selection signal in such a manner that the multiplexer outputs the analog replica signal, when a second command included in the first RF signal is a replica sensor check command, and to generate the first selection signal in such a manner that the multiplexer outputs the analog detection signal, when a third command included in the first RF signal is a sensor check command, wherein the first command, the second command, and the third command are sequentially transmitted to the first RF tag logic circuit.

4. The dual band RFID tag of claim 3, further comprising:
a second RF tag logic circuit configured to generate the second selection signal in such a manner that the multiplexer outputs the output signal of the voltage distributor, when a fourth command included in the second RF signal is the power check command, to generate the second selection signal in such a manner that the multiplexer outputs the analog replica signal, when a fifth command included in the second RF signal is the replica sensor check command, and to generate the second selection signal in such a manner that the multiplexer outputs the analog detection signal, when a sixth command included in the second RF signal is the sensor check command, wherein the fourth command, the fifth command, and the sixth command are sequentially transmitted to the second RF tag logic circuit.

5. The dual band RFID tag of claim 4, further comprising:
an RF detector configured to enable the first rectifier, the first regulator, and the first RF tag logic circuit and disable the second rectifier, the second regulator, and the second RF tag logic circuit, when only the first RF signal of the first RF signal and the second RF signal is received, and to disable the first rectifier, the first regulator, and the first RF tag logic circuit and enable the second rectifier, the second regulator, and the second RF tag logic circuit when only the second RF signal of the first RF signal and the second RF signal is received.

6. A detection data processing device comprising:
a dual band RFID tag; and
a sensor connected to the dual band RFID tag,
wherein the dual band RFID tag comprises:
a first rectifier configured to receive and rectify a first RF signal modulated at a first frequency;
a first regulator configured to regulate an output voltage of the first rectifier;
a second rectifier configured to receive and rectify a second RF signal modulated at a second frequency;
a second regulator configured to regulate an output voltage of the second rectifier;
a voltage distributor connected to a first node and a ground in a state of being positioned therebetween, the output terminal of the first rectifier and the output terminal of the second rectifier being both connected to the first node;
a multiplexer configured to output any one of an analog detection signal output from the sensor and an output signal of the voltage distributor, in response to a first selection signal or a second selection signal;
an analog-to-digital converter configured to receive as an operating voltage a voltage of a second node to which an output terminal of the first regulator and an output terminal of the second regulator are both connected and to convert an output voltage of the multiplexer into a digital signal;

a first RF tag logic circuit configured to generate the first selection signal in such a manner that the multiplexer outputs the output signal of the voltage distributor, when a command included in the first RF signal is a power check command, and to generate the first selection signal in such a manner that the multiplexer outputs the analog detection signal, when the command included in the first RF signal is a sensor check command; and a second RF tag logic circuit configured to generate the second selection signal in such a manner that the multiplexer outputs the output signal of the voltage distributor, when a command included in the second RF signal is the power check command, and to generate the second selection signal in such a manner that the multiplexer outputs the analog detection signal, when the command included in the second RF signal is the sensor check command.

7. The detection data processing device of claim 6, further comprising:
an RF detector configured to enable the first rectifier, the first regulator, and the first RF tag logic circuit and disable the second rectifier, the second regulator, and the second RF tag logic circuit, when only the first RF signal of the first RF signal and the second RF signal is received, and to disable the first rectifier, the first regulator, and the first RF tag logic circuit and enable the second rectifier, the second regulator, and the second RF tag logic circuit, when only the second RF signal of the first RF signal and the second RF signal is received.

8. A detection data processing device comprising:
a dual band RFID tag; and
a sensor connected to the dual band RFID tag;
wherein the dual band RFID tag comprises:
a first rectifier configured to receive and rectify a first RF signal modulated at a first frequency;
a first regulator configured to regulate an output voltage of the first rectifier;
a second rectifier configured to receive and rectify a second RF signal modulated at a second frequency;
a second regulator configured to regulate an output voltage of the second rectifier;
a voltage distributor connected to a first node and a ground in a state of being positioned therebetween, the output terminal of the first rectifier and the output terminal of the second rectifier being both connected to the first node;
a replica sensor configured to generate an analog replica signal;
a multiplexer configured to output any one of an analog detection signal output from the sensor, the analog replica signal, and an output signal of the voltage distributor, in response to a first selection signal or a second selection signal; and
an analog-to-digital converter configured to receive as an operating voltage a voltage of a second node to which an output terminal of the first regulator and an output terminal of the second regulator are both connected and to convert an output voltage of the multiplexer into a digital signal;
a first RF tag logic circuit configured to generate the first selection signal in such a manner that the multiplexer outputs the output signal of the voltage distributor, when a first command included in the first RF signal is a power check command, to generate the first selection signal in such a manner that the multiplexer outputs the analog replica signal, when a second command included in the first RF signal is a replica sensor check command, and to generate the first selection signal in such a manner that the multiplexer outputs the analog detection signal, when a third command included in the first RF signal is a sensor check command, wherein the first command, the second command, and the third command are sequentially transmitted to the first RF tag logic circuit.

9. The detection data processing device of claim 8, further comprising:

a second RF tag logic circuit configured to generate the second selection signal in such a manner that the multiplexer outputs the output signal of the voltage distributor, when a fourth command included in the second RF signal is the power check command, to generate the second selection signal in such a manner that the multiplexer outputs the analog replica signal, when a fifth command included in the second RF signal is the replica sensor check command, and to generate the second selection signal in such a manner that the multiplexer outputs the analog detection signal, when a sixth command included in the second RF signal is the sensor check command, wherein the fourth command, the fifth command, and the sixth command are sequentially transmitted to the second RF tag logic circuit.

10. The detection data processing device of claim 9, further comprising:

an RF detector configured to enable the first rectifier, the first regulator, and the first RF tag logic circuit and disable the second rectifier, the second regulator, and the second RF tag logic circuit, when only the first RF signal of the first RF signal and the second RF signal is received, and to disable the first rectifier, the first regulator, and the first RF tag logic circuit and enable the second rectifier, the second regulator, and the second RF tag logic circuit, when only the second RF signal of the first RF signal and the second RF signal is received.

* * * * *